Sept. 10, 1968     D. L. WILLIAMS ET AL     3,401,238

CABLE PAIR IDENTIFIER

Filed June 21, 1965                                         9 Sheets-Sheet 1

INVENTORS   DEWI L. WILLIAMS
GRAEME SCOTT
KAZIMIERZ L. JAKIMCZUK

BY *Curphey & Erickson*
PATENT AGENTS

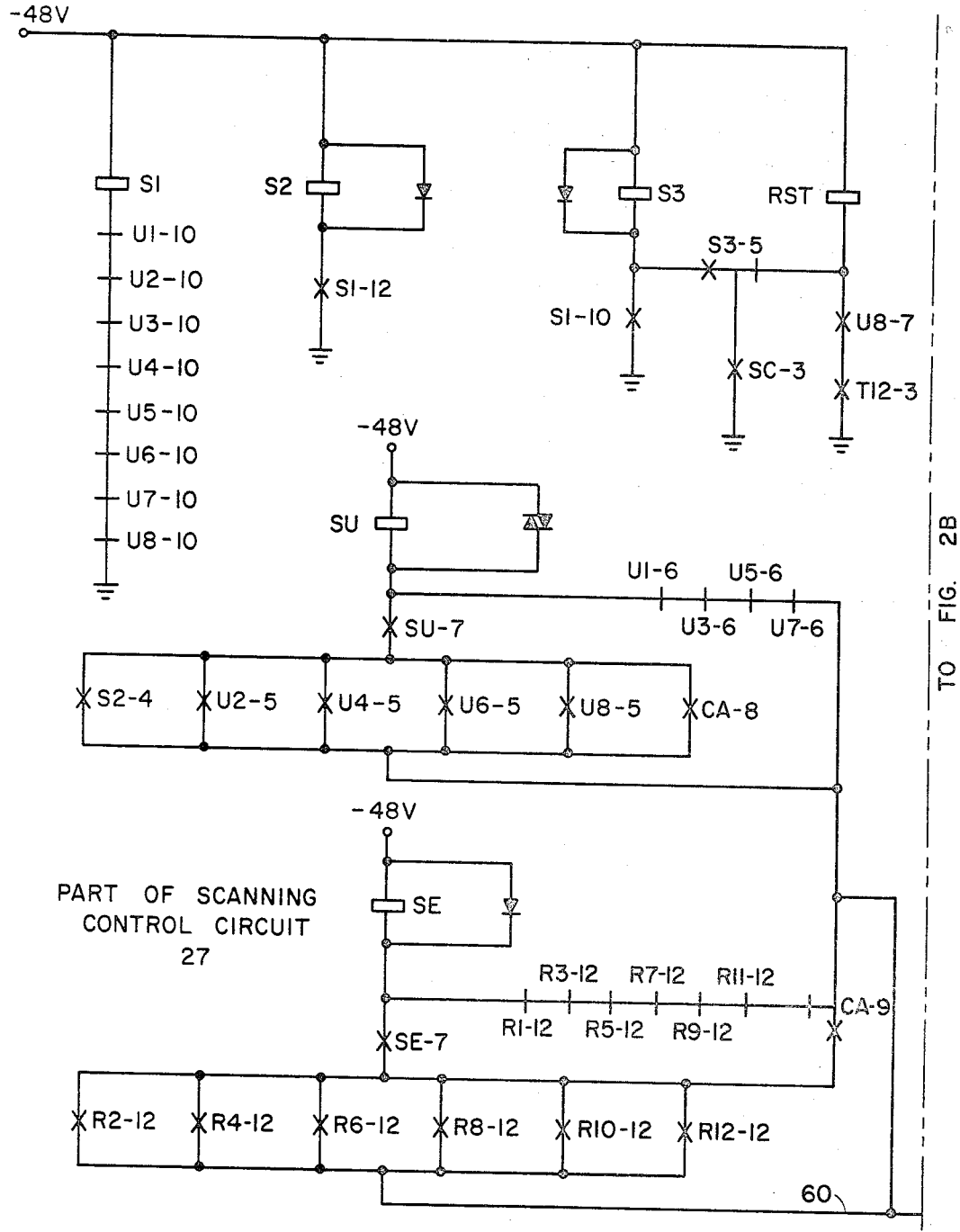

PART OF SCANNING CONTROL CIRCUIT
27

PART OF SCANNING CONTROL CIRCUIT
27

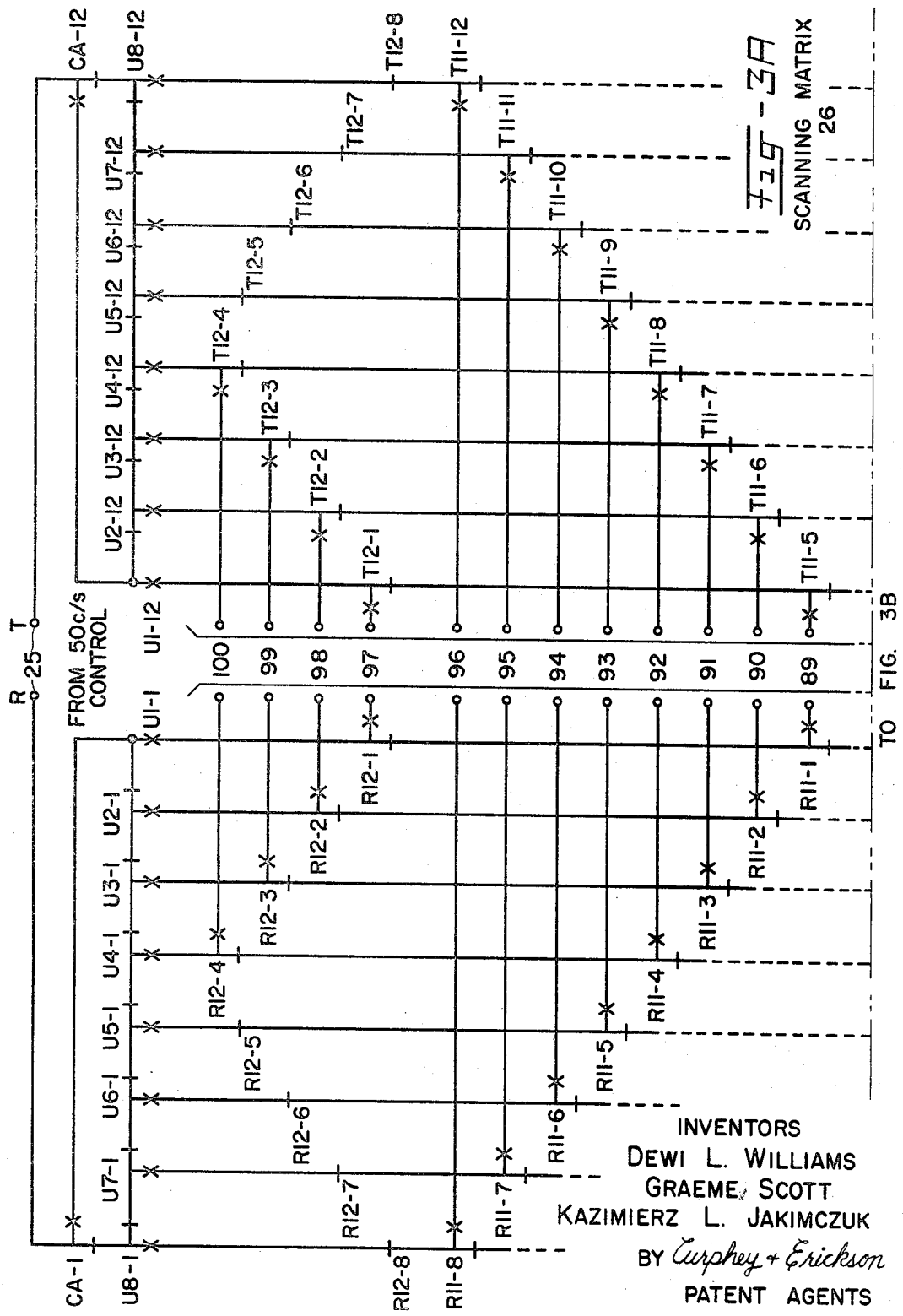
Fig-3A SCANNING MATRIX 26

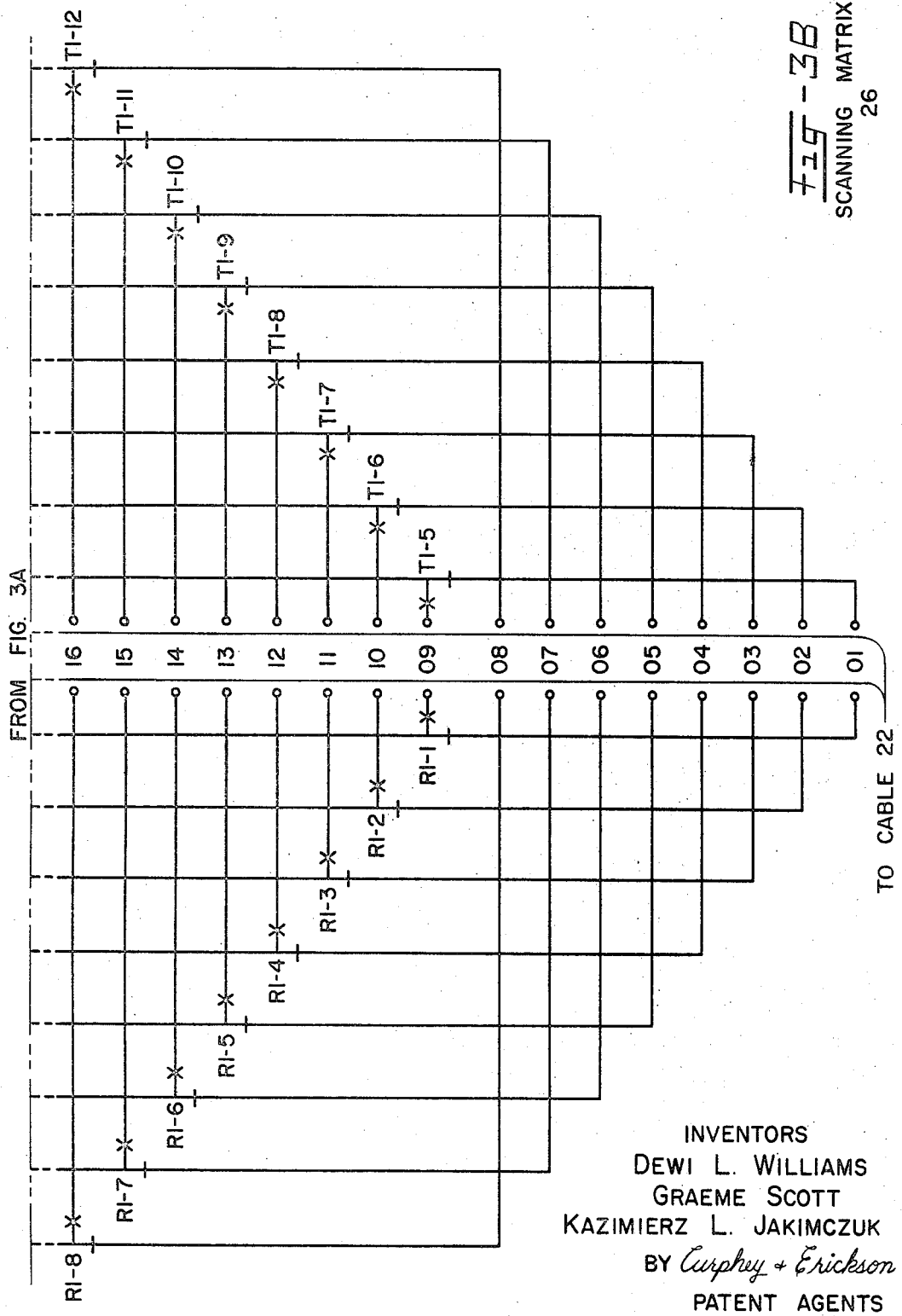

INVENTORS
DEWI L. WILLIAMS
GRAEME SCOTT
KAZIMIERZ L. JAKIMCZUK

BY *Curphey & Erickson*
PATENT AGENTS

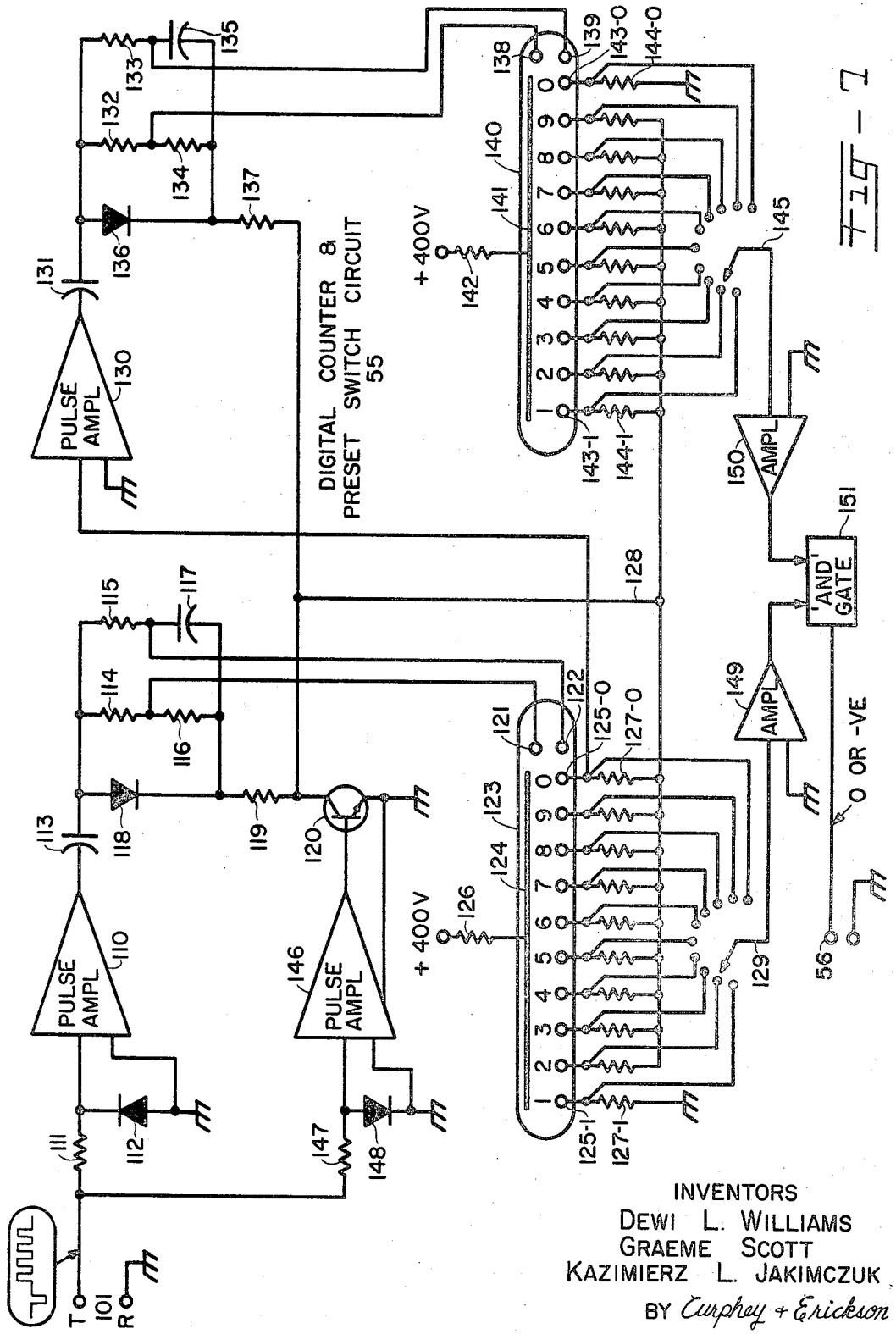

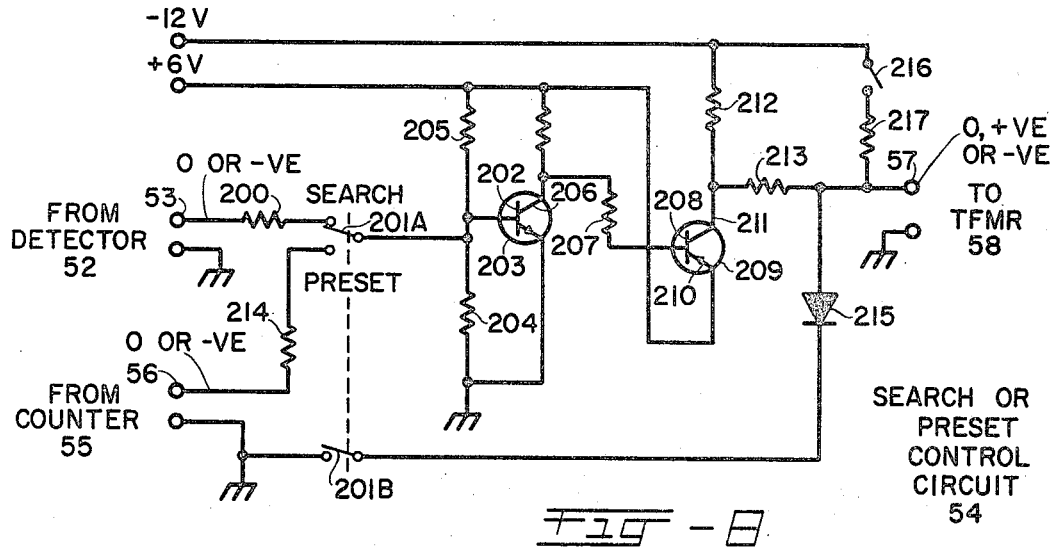
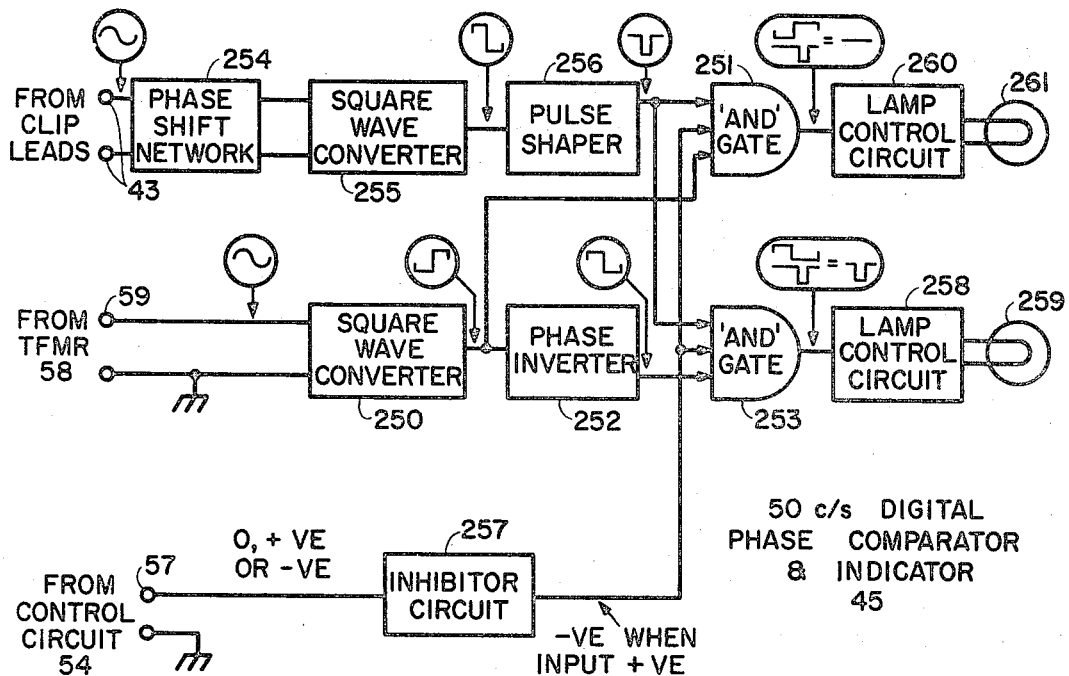

United States Patent Office 3,401,238
Patented Sept. 10, 1968

3,401,238
CABLE PAIR IDENTIFIER
Dewi Lloyd Williams, Chateauguay Centre, Quebec,
Graeme Scott, Lachine, Quebec, and Kazimierz Leopold
Jakimczuk, La Salle, Quebec, Canada, assignors to
Northern Electric Company Limited, Montreal, Quebec,
Canada
Filed June 21, 1965, Ser. No. 465,435
4 Claims. (Cl. 179—175.25)

ABSTRACT OF THE DISCLOSURE

A cable pair identifier having a central office unit for applying a signal to a preselected pair and a reference pair of wires in a multipair cable; and a field unit having a receiver for detecting the signal on the preselected pair of wires. The improvement in the receiver comprising a phase comparator for comparing the phase of the signal on the preselected pair against that of the reference pair so as to identify the polarity of the selected pair of wires.

---

This invention relates to a cable pair identifier and more particularly to apparatus which automatically indicates the number of a selected pair of wires in a multipair cable.

In the installation of telephone cables, comprising a plurality of pairs of conductors, from a central office telephone exchange to a remote location, it is essential that a lineman at the remote point be able to identify by number, each pair of wires in the multipair cable. In the early stages of the development of this art, the services of two men were employed; the lineman at the remote end of the multipair cable and an assistant in the central office. The assistant would connect an audio tone to a single pair of wires and the lineman at the remote end of the cable would probe for this pair of wires using suitable detection equipment such as a telephone headset. Once communication was established between the two points over the single pair of wires, the other pairs would be identified in a similar manner. This system was not only slow and expensive, since it required the services of two men, but was vulnerable to errors due to any misunderstanding of instructions between the two workmen.

An improvement was made in this basic system whereby once initial contact had been made between the central office and the remote point over a control pair of wires, the lineman at the remote location could automatically place the tone on a selected pair of wires by means of a selector circuit located in the central office and a pulse dialing instrument located at the remote point. However, in every instance, heretofore known, once the tone is placed on the preselected pair of wires, it is necessary for the splicer to probe each of the pairs of wires to locate the selected pair. This hit and miss method of locating the preselected pair of wires, on which the tone has been placed, is still time consuming and hence expensive.

In a further improvement, this disadvantage has been overcome by providing a scanning unit which sequentially connects in numerical order the tone from a signal source to each of the pairs of numbered wires in a multipair cable. At the remote location, a receiving unit detects the presence of the signal on a preselected pair of wires in the multipair cable. A control means responsive to the output of the receiving unit automatically stops the scanning means when the tone is detected. To identify the number of the pair of wires, a digital counter, forming part of the receiving unit, counts the number of pulses generated by a pulse generator simultaneously with the connection of the signal source to each of the pair of wires in the cable. Thus, when the scanning unit is stopped by the presence of the tone on the preselected pair of wires, the digital counter automatically registers the number of that pair.

In a still further improvement, the present invention comprises means for identifying the polarity of the two wires. This is accomplished by simultaneously applying a second signal source to the selected pair of wires and to a reference pair of wires, and by comparing the phase of the two signals at the remote location. Means is provided for indicating whether or not the two signals are substantially in phase or out of phase, thereby indicating whether or not the correct polarity for the two wires has been chosen.

In order that the identification procedure may be carried on while the cable is in service, the tone from the signal source used in identifying the preselected pair of wires is ultrasonic, while the tone used for identifying the polarity of the pair of wires is infrasonic.

In a still more preferred embodiment, the invention includes means associated with the digital counter for automatically stopping the scanning means so as to place the signal from the first source on a pair of wires having a preselected number. In addition, the receiving unit includes a probe adapted to pass between the pairs of wires, for detecting the presence of the signal on the pair having the preselected number and thereby identifying it.

A preferred embodiment of the invention will now be described with reference to the accompanying drawings in which:

FIGURES 2A, 2B and 2C are schematic circuit diagrams of a scanning control circuit which forms part of the invention illustrated in FIGURE 1;

FIGURES 3A and 3B shows a schematic circuit diagram of a scanning matrix which forms part of the invention illustrated in FIGURE 1;

FIGURE 7 is a schematic circuit diagram of a digital counter and preset switch circuit which forms part of the invention illustrated in FIGURE 1;

FIGURE 8 is a schematic circuit diagram of a search or preset control circuit which forms part of the invention illustrated in FIGURE 1; and FIGURE 9 is a block circuit diagram of a digital phase comparator and indicator which forms part of the invention illustrated in FIGURE 1.

Figure 1:
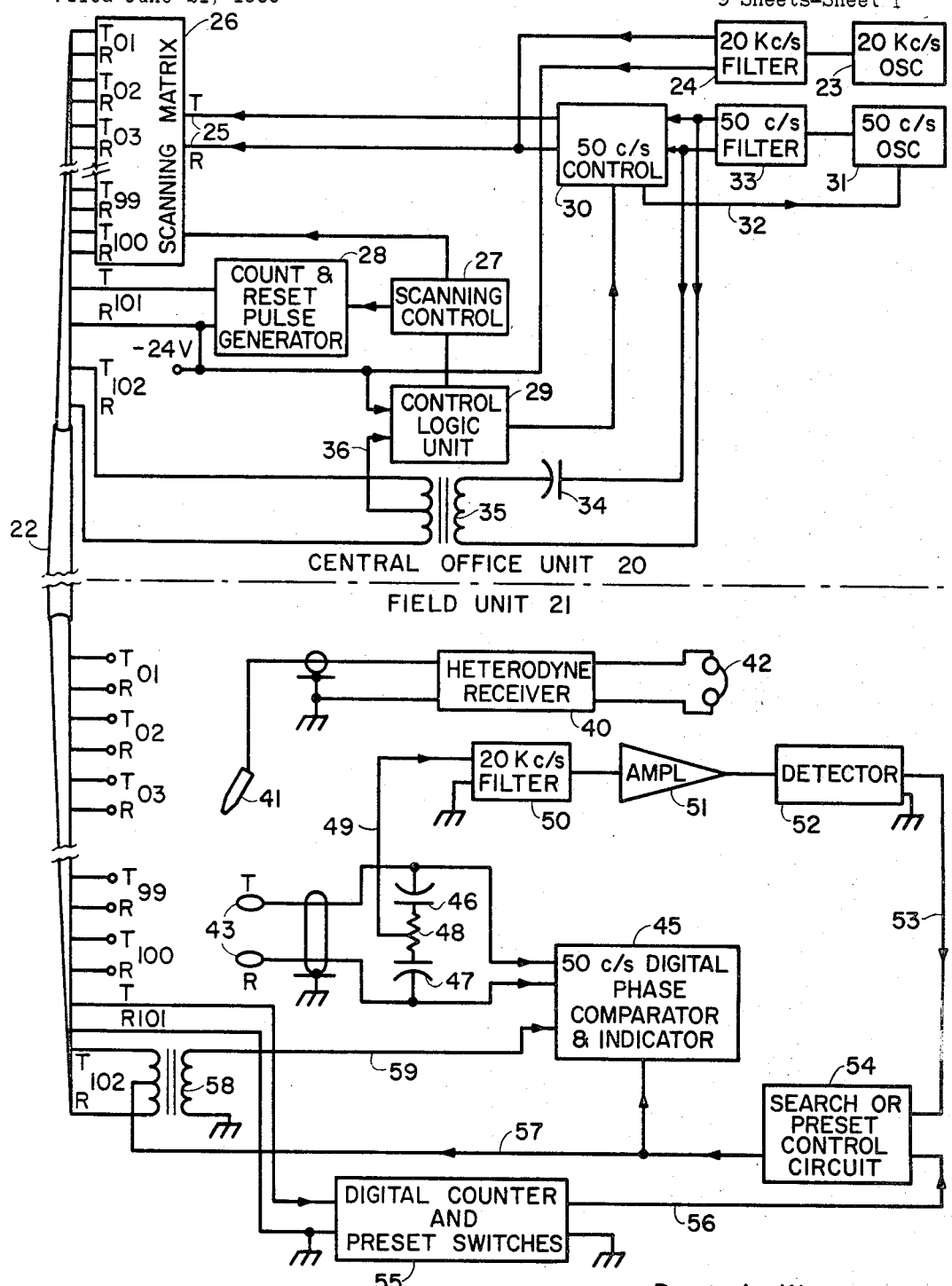
FIGURE 1 is a block and schematic circuit diagram of a cable-pair identifier in accordance with the present invention.

Referring to FIGURE 1 of the drawings, the cable-pair identifier comprises a central-office unit 20 and a field unit 21 interconnected with each other by a multipair cable 22. The multipair cable 22 in the present embodiment contains 102 pairs of wires of which the first 100 pairs, numbered 01 to 100, are used for carrying telephone conversations while the last two pairs, numbered 101 and 102, are used as control pairs between the central-office unit 20 and the field unit 21. The latter two pairs may be used as spares once the initial identification has been completed. For simplicity, only cable pairs 01, 02, 03, 99, 100, 101 and 102 have been shown in FIGURE 1; however, it is understood that all pairs are present in an actual embodiment. The invention is of course not limited to 100 pairs but this number was chosen in the present embodiment since large cables are generally divided into 100 pair groups with 1 or 2 extra pairs being included in the group as spares.

Each wire of a pair is designated by the letter T or the letter R which stands for tip and ring respectively. This terminology is well known in the telephone industry and is derived from switchboard plugs in which a balanced pair of wires is fed to either the tip or ring of the plug. In all cases, corresponding reference characters at each end of the cable 22 will represent corresponding pairs of wires.

The lead 101R is connected to a —24 volt source of voltage in the central office unit 20, and to the chassis of the field unit 21. This elevates the chassis of the field unit 21 to —24 volts with respect to ground. Unless otherwise stated, all voltages referred to in the field unit 21 will be with respect to the chassis and not to ground. The lead 101T carries either positive counting pulses or negative reset pulses, with respect to the lead 101R, between the central office unit 20 and the field unit 21 as hereinafter explained.

The control pair of leads 102R and 102T carry 50 cycle per second reference signals from the central office unit 20 to the field unit 21. In addition, start and stop signals which control the central office unit 20 are carried from the field unit 21 on a simplex circuit superimposed on the pair of leads 102.

The central office unit 20 comprises an ultrasonic 20 kilocycle per second oscillator 23; the output of which is fed to a 20 kilocycle per second filter 24. The output of the filter 24 is connected on one side to an input connection 25R of a scanning matrix 26 and on the other side to the reference lead 101R.

The scanning matrix 26 is controlled by a scanning control circuit 27, which also controls a count and reset pulse generator 28. The scanning control circuit 27 is in turn controlled by a control logic circuit 29 which in turn is controlled by the output of the field unit 21 through the control pair of wires 102, as hereinafter explained. The control logic circuit 29 also controls a 50 cycles per second control circuit 30 which in turn controls the power supplied to an infrasonic 50 cycles per second oscillator 31 through a lead 32. The output of the oscillator 31 is coupled through a 50 cycles per second filter 33 and thence through the control circuit 30 to the input leads 25 of the scanning matrix 26. In addition, the output from the filter 33 is coupled through a D-C isolating capacitor 34 and a transformer 35 to the control pair of wires 102. A centre tap on the secondary of the transformer 35 is connected through a control lead 36 to the control logic circuit 29.

The field unit 21 comprises a heterodyne receiver 40 having a search probe 41 connected to its input and a pair of headphones 42 connected to its output. The receiver 40 is adapted to convert input signals of 20 kilocycles per second to output signals of 1,000 cycles per second which are fed to the headphones 42.

The field unit 21 also comprises a pair of balanced clip leads 43T and 43R which are connected to the input of a 50 cycles per second digital phase comparator and indicator 45. Connected in series across the clip leads 43 are D-C isolating capacitors 46 and 47, and a center tapped resistor 48.

The center tap of the resistor 48 is connected through a lead 49 to the input of a 20 kilocycle per second filter 50. The output of the filter 50 is connected through an amplifier 51 to a detector 52. The output from the detector 52 is connected through a lead 53 to a search or preset control circuit 54.

To register the number of pulses from the pulse generator 28 in the central office unit 20 received by the field unit 21, a digital counter and preset switch circuit 55 is connected through the control pair 101 to the generator 28. An output from the counter and switch circuit 55 is connected through a control lead 56 to the search or preset control circuit 54. An output from the control circuit 54 is connected through a control lead 57 to the comparator 45 and to a center tap on the primary of transformer 58 which in turn is connected across the control pair 102; the secondary of the transformer 48 is connected through a control lead 59 to the comparator 45.

FIGURES 2A, 2B and 2C, and FIGURE 3, illustrate in detail the scanning control circuit 27 and the scanning matrix 26 respectively. These figures as well as FIGURES 4, 5 and 6 utilize detached contact schematic diagrams to show relay contacts.

Figure 2B:
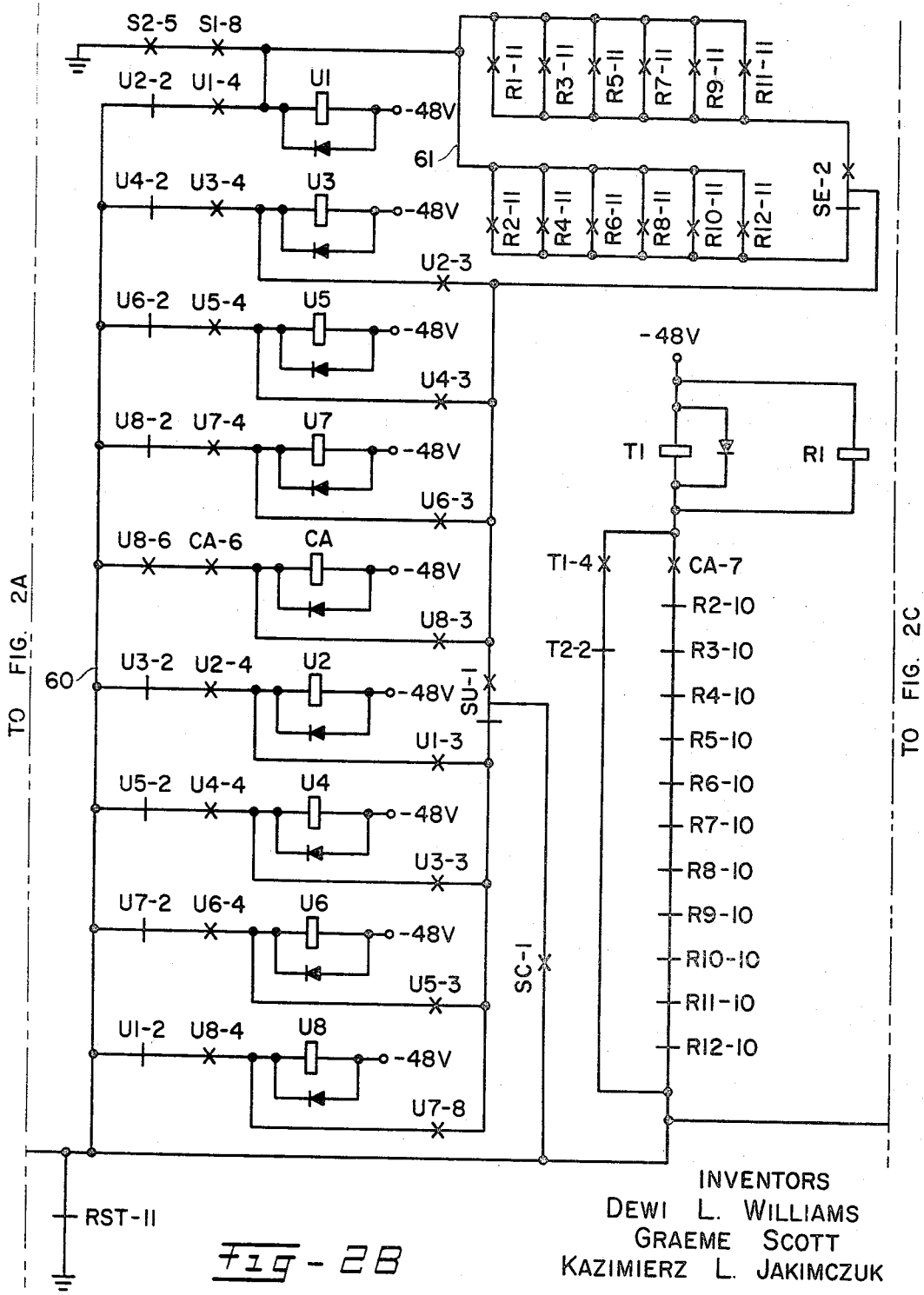
Figure 2C:
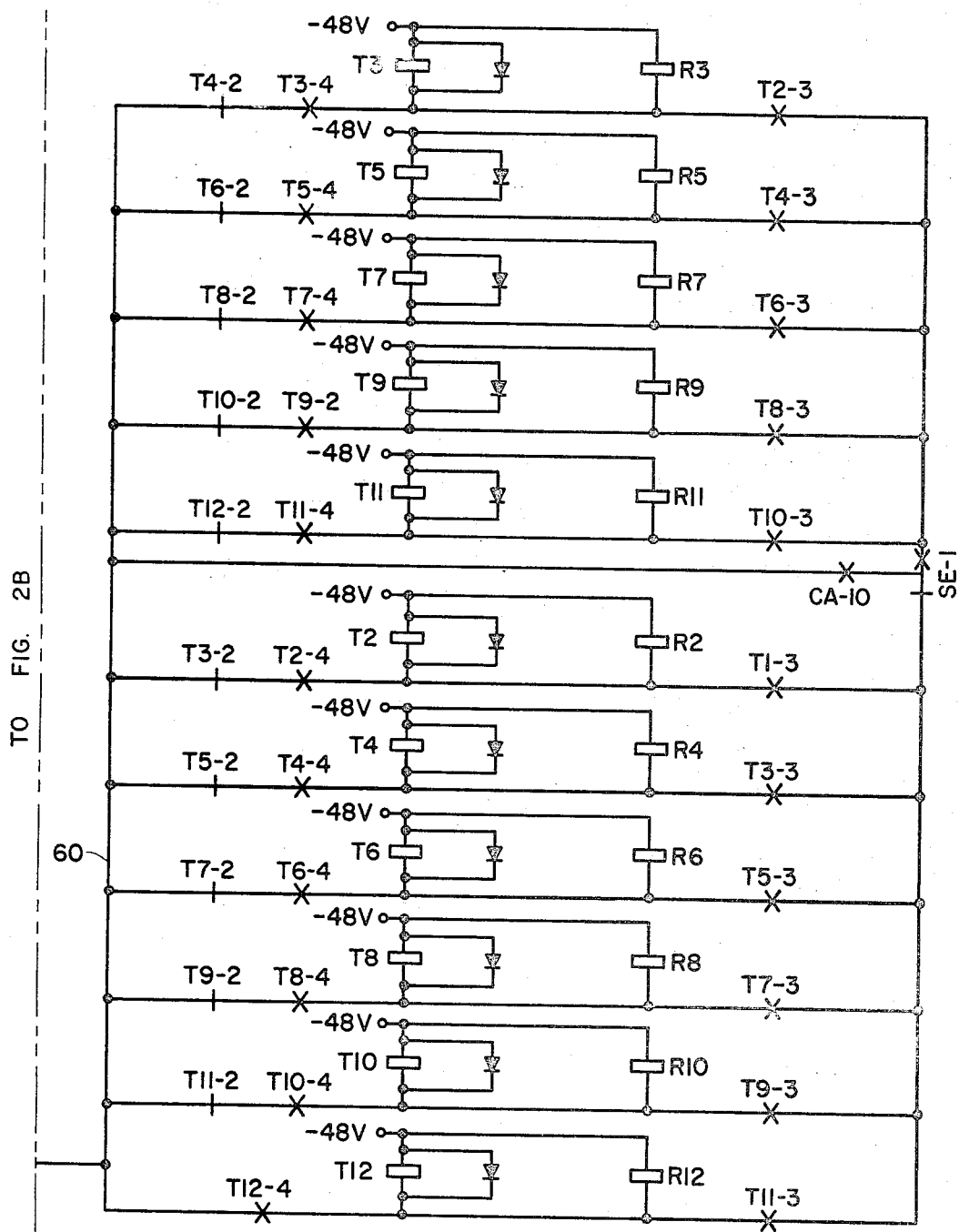

Referring now to FIGURES 2A, 2B and 2C, the scanning control circuit 27 comprises start relays S1, S2 and S3; a reset relay RST; a steering "units" relay SU; a steering "eights" relay SE; a carry relay CA; "units" relays U1, U2, U3, U4, U5, U6, U7 and U8; tip "eights" relays T1, T2, T3, T4, T5, T6, T7, T8, T9, T10, T11 and T12; and ring "eights" relays R1, R2, R3, R4, R5, R6, R7, R8, R9, R10, R11, and R12.

Germanium diodes are connected in shunt with the relays S2, S3, SE, U1–U8, CA, and T1–T12, to delay their release and allow succeeding relays time to operate before they drop out. A varistor, placed in shunt with relay SU, serves a similar purpose and also delays the pull-in of this relay. The application of diodes and varistors for this purpose is well known to those in the telephone art and needs no further explanation.

Referring to FIGURE 2A, the relay coil S1 is connected in series with break contacts U1–10 to U8–10 between a source of —48 volts and ground. The relay coil S2 is connected in series with make contacts S1–12 between a source of —48 volts and ground. The relay coil S3 is connected in series with the make contacts S1–10 between a source of —48 volts and ground. The relay coil RST is connected in series with make contacts U8–7 and T12–3 between a source of —48 volts and ground. Connected between one end of the coil S3 and one end of the coil RST are transfer contacts S3–5. The transfer arm of the transfer contacts S3–5 is connected to ground through make contacts SC–3 of a scanning control relay SC which forms part of the control logic circuit 29, shown in detail in FIGURE 5.

The relay coil SU is connected from a source of —48 volts to a control lead 60 through series connected break contacts U1–6, U3–6, U5–6 and U7–6. Connected in shunt with the series combination of break contacts U1–6, U3–6, U5–6, and U7–6 is break contact SU–7 connected in series with shunt connected break contacts S2–4, U2–5, U4–5, U6–5, U8–5 and CA–8.

The relay coil SE is connected between a source of —48 volts and the control lead 60 through series connected break contacts R1–12, R3–12, R5–12, R7–12, R9–12, R11–12, and the break contact of transfer contacts CA–9. Connected in shunt with the series combination of break contacts R1–12, R3–12, R5–12, R7–12, R9–12, R11–12 and the break contact of transfer contacts CA–9, are break contacts SE–7 connected in series with shunt connected break contacts R2–12, R4–12, R6–12, R8–12, R10–12, R12–12, and the break contacts of transfer relay CA–9.

Referring to FIGURE 2B, the relay coil U1 is connected in series with make contacts U1–4 and break contacts U2–2 between a source of —48 volts and the control lead 60; the control lead 60 being connected to ground through break contacts RST–11. A lead 61 connected to the junction of the relay coil U1 and the make contacts U1–4 is connected to ground through series connected make contacts S1–8 and S2–5. In addition, this lead 61 is connected to one of the ends of each of shunt connected make contacts R1–11, R2–11, R3–11, R4–11, R5–11, R6–11, R7–11, R8–11, R9–11, R10–11, R11–11 and R12–11. The other ends of the shunt connected make contacts R1–11, R3–11, R5–11, R7–11, R9–11, and R11–11, are connected to make contact of transfer contacts SE–2. The other ends of the shunt connected make contacts R2–11, R4–11, R6–11, R8–11, R10–11, and R12–11, are connected to the break contact of transfer contacts SE–2. The transfer arm of contacts SE–2 is connected to the make contact of transfer contacts SU–1.

The relay coil U3 is connected in series with make contacts U3–4 and break contacts U4–2 between a source of —48 volts and the control lead 60. The junction of the relay coil U3 and the make contacts U3–4 is connected to the make contacts of transfer contacts SU–1 through make contacts U2–3. In a similar manner relay coils U5, U7 and CA are connected to a source of −48 volts, the control lead 60 and the make contacts of the transfer contacts SU–1.

The relay coil U2 is connected in series with make contacts U2–4 and break contacts U3–2 between a source of −48 volts and the control lead 60. The junction of the relay coil U2 and the make contacts U2–4 is connected to the break contact of transfer contacts SU–1 through make contacts U1–3. In a similar manner relay coils U4, U6 and U8 are connected to a source of −48 volts, the control lead 60 and the break contact of transfer contacts SU–1. The transfer arm of contact SU–1 is connected to the control lead 60 through make contacts SC–1 of a scanning control relay SC which as heretofore mentioned forms part of the control logic circuit 29.

The relay coils T1 and R1 are connected in shunt with each other and in series with make contacts T1–4 and break contacts T2–2 between a source of −48 volts and the control lead 60. Connected in shunt with the series connected make contacts T1–4 and break contacts T2–2, are series connected make contacts CA–8 and break contacts R2–10, R3–10, R4–10, R5–10, R6–10, R7–10, R8–10, R9–10, R10–10, R11–10 and R12–10.

Referring to FIGURE 2C, the relay coils T2 and R2 are connected in shunt with each other and in series with make contacts T2–4 and break contacts T3–2 between a source of −48 volts and the control lead 60. The junction of the coils T2, R2 and make contacts T2–4 is connected to the break contacts of transfer contacts SE–1 through make contacts T1–3. In a similar manner the relay coils T4, R4; T6, R6; T8, R8; T10, R10; and T12, R12 are connected to a source of −48 volts, the control lead 60 and the break contacts of transfer relay SE–1. Also in a similar manner, the coils T3, R3; T5, R5; T7, R7; T9, R9; and T11, R11 are connected to a source of −48 volts, the control lead 60 and the make contacts of the transfer contacts SE–1. The transfer arm of contacts SE–1 is connected to the control lead 60 through make contacts CA–10.

Referring to FIGURES 3A and 3B, the scanning matrix 26 utilizes transfer contacts from the relays CA, U2 to U8, R1 to R12, and T1 to T12 and also make contacts from the relay U1. The matrix 26 forms an 8 x 13 grid yielding 104 distinct relay combinations. However, in the present embodiment the last four positions are not used and hence break contacts are used on parts of relays R12 and T12 rather than transfer contacts. For simplicity, only the first 16 positions and the last 12 positions of the matrix 26 are shown; the other 72 positions being positioned in a logical order between the ones illustrated. Input signals are coupled from the 50 cycles control circuit 30 to the input connections 25. From there, the signals are directed through the appropriate contacts of the relays in the scanning matrix 26 and are sequentially applied in numerical order to the pairs of wires in the multipair cable 22 which is connected to the output of the matrix 26. The operation of this matrix will be described hereinafter in conjunction with the scanning control circuit 27.

Figure 4:
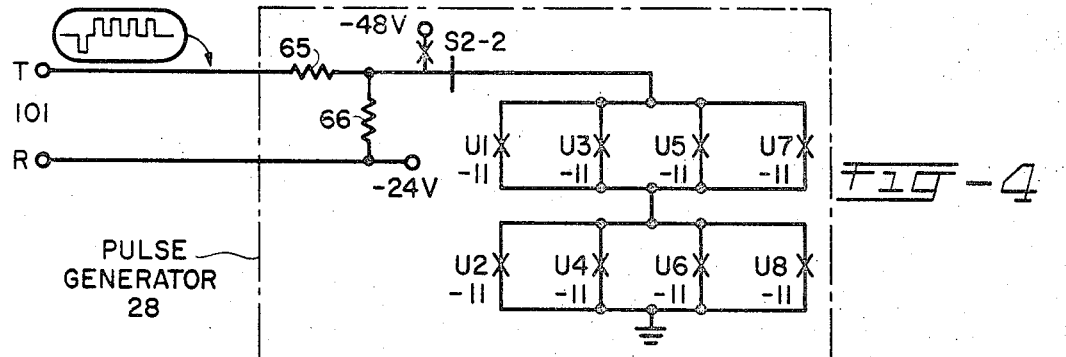
FIGURE 4 is a schematic circuit diagram of a count and reset pulse generator which forms part of the invention illustrated in FIGURE 1.

Referring to FIGURE 4, the pulse generator 28 comprises make contacts U1–11, U3–11, U5–11, and U7–11, connected in shunt; the combination being connected in series with the shunt connected combination consisting of make contacts U2–11, U4–11, U6–11, and U8–11; and also in series with the break and make contacts of transfer contacts S2–2 between a source of −48 volts and ground. The transfer arm of contacts S2–2 is connected to lead 101T through a resistor 65. A resistor 66 is connected between the transfer arm of contacts S2–2 and the lead 101R. A series of positive counting pulses are produced on lead 101T, with respect to the −24 volts on lead 101R, whenever one odd and one even "units" relays are operated at the same time due to the slow release characteristic of these relays as hereinbefore explained. Each pulse lasts approximately 10 milliseconds and occurs when a path is completed through the resistor 65, the break contact of transfer contacts S2–2, and any one of the make contacts U1–11, U3–11, U5–11, U7–11, and U2–11, U4–11, U6–11, U8–11 to ground. A negative reset pulse is applied to lead 101T with respect to the −24 volts on lead 101R, whenever make contacts of transfer contacts S2–2 connect −48 volts to lead 101T through the resistor 65. The resistors 65, and 66 in conjunction with the capacity of the leads 101, act as a filter and thereby provide clean transient free pulses to the field unit 21. As can be seen from FIGURE 1, the positive counting pulses and the negative reset pulses will be coupled through leads 101 to the digital counter 55.

Figure 5:
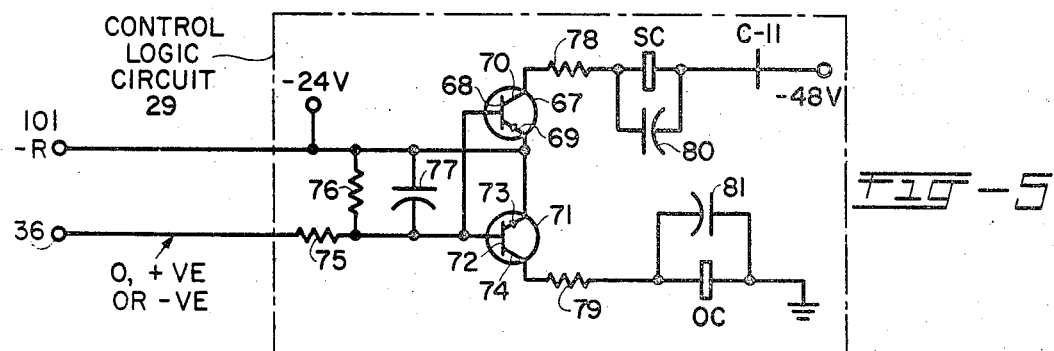
FIGURE 5 is a schematic circuit diagram of a control logic circuit which forms part of the invention illustrated in FIGURE 1.

Referring to FIGURE 5, the control logic circuit 29 comprises a PNP transistor 67, having a base 68, an emitter 69 and a collector 70; and an NPN transistor 71 having a base 72, an emitter 73 and a collector 74. The two emitters 69 and 73 are connected to each other and to the reference lead 101R which in turn is connected to the reference voltage of −24 volts. The two bases 68 and 72 are connected to each other and to the lead 36 through a current limiting resistor 75. A resistor 76 and a capacitor 77, connected between the bases 68 and 72 and the emitters 69 and 73, suppress incoming noise on the lead 36 and prevent erroneous operation of the circuit 29.

Figure 6:
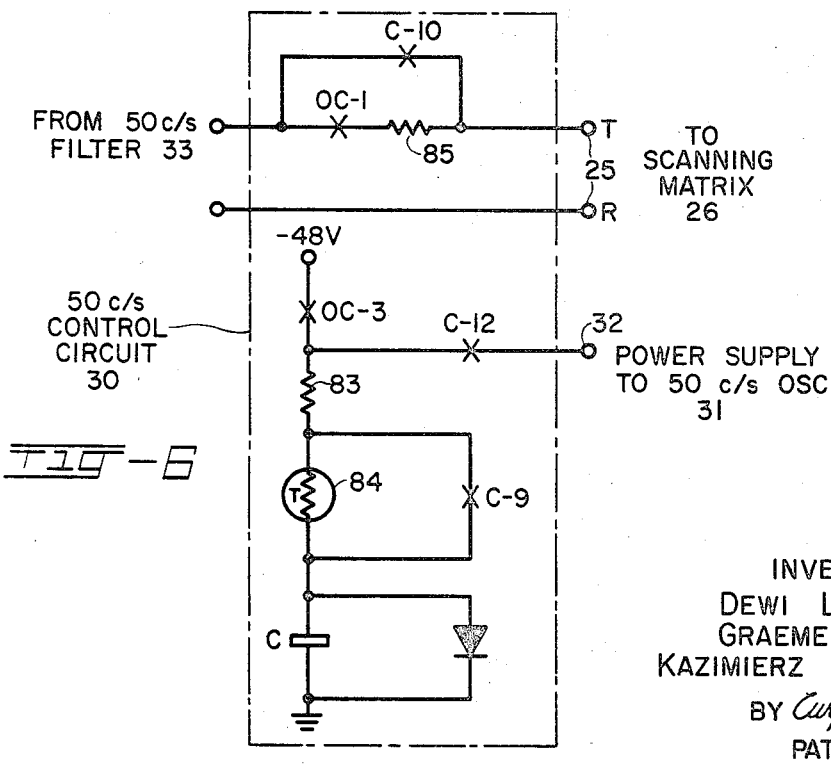
FIGURE 6 is a schematic circuit diagram of a 50 cycles per second control circuit which forms part of the invention illustrated in FIGURE 1.

The collector 70 is connected through a current limiting resistor 78, a scanning control relay SC and break contacts C–11, of a control relay C located in the control circuit 30 which is described in detail in FIGURE 6, to a source of −48 volts. The collector 74 is connected through a current limiting resistor 79 and an oscillator control relay OC to ground. Capacitors 80 and 81 are connected in shunt with the relays SC and OC respectively. The resistors 78 and 79 and the capacitors 80 and 81 provide a slight delay in the operate and release of the relays SC and OC and also suppress transients.

Referring to FIGURE 6, the 50 cycle per second control circuit 30 comprises make contacts OC–3, a current limiting resistor 83, a thermistor 84, and a control relay C, connected between a source of −48 volts and ground. To momentarily delay the release of the relay C, a diode is connected in shunt therewith. As hereinbefore explained, the use of diodes for this purpose is well known. The thermistor 84, in conjunction with the resistor 83, serve to provide a delay between the close of make contacts OC–3 and the operation of the relay C. Make contacts C–9 place a short circuit across the thermistor 84 upon actuation of the relay C which allows the thermistor 84 to cool and thereby readies it for the next time the relay OC operates. Make contacts C–12 are connected between the junction of the make contacts OC–3 and the resistor 83, and the control lead 32.

In addition, the 50 cycle per second control circuit 30 comprises make contacts C–10 connected between the output of the filter 33 and the lead 25T which connects to the scanning matrix 26. Connected in shunt with the make contacts C–10 are series connected make contacts OC–1 and a resistor 85.

Referring to FIGURES 5 and 6, when there is no potential difference between the voltage on the lead 36 and the lead 101R, the transistors 67 and 71 are cut-off. When the lead 36 is positive with respect to the lead 101R, the transistor 71 conducts and the relay OC operates. This in turn actuates the relay OC which closes the make contacts OC–3, and after a time delay determined by the impedance of the thermistor 84 and the resistor 83 allows relay C to operate. Upon the operation of the relay C, power is supplied to the 50 cycles per second oscillator 31 through the control lead 32 and the make contacts C–10 close thereby coupling the 50 cycles signal from the output of the filter 33 to the scanning matrix 26 through the control lead 25R. Previous operation of the relay OC has connected the output of the filter 33 to the scanning matrix 26 through the resistor 85 and the make contacts OC–1. This prevents large transients from occurring when the make contacts C–10 close.

If the lead 36 is negative with respect to the lead 101R, the transistor 67 conducts and the relay SC operates, providing the relay C has dropped out and the break contacts C–11 are closed. The operation of the relay SC places the scanning control circuit 27 in operation as hereinafter explained.

The control logic circuit 29 is controlled by the search or preset control circuit 54, located in the field unit 21, through the lead 57, the transformer 58, the leads 102T and 102R, the transformer 35 and the lead 36 which is connected to the input thereof. The operation of the control logic circuit 29 will be explained hereinafter in conjunction with FIGURE 8.

FIGURE 7 illustrates the digital counter and preset switch circuit 55. The input signal coupled to the input connections 101T and 101R of the circuit 55 comprises a pulse train consisting of either a negative reset pulse or a series of positive counting pulses, supplied by the count and reset pulse generator 28. The positive pulses are coupled to a pulse amplifier 110 through a clipping network comprising a resistor 111 and a diode 112 which ground the negative pulses of the incoming pulse train. Each positive input pulse to the amplifier 110 produces a negative output pulse of approximately 100 volts amplitude and these are coupled through a coupling capacitor 113 to a phasing network comprising resistors 114, 115, 116 and a capacitor 117. A diode 118 connected in shunt with the phasing network bypasses any positive overshoot spikes to chassis through a series connected resistor 119 and a transistor 120. The negative pulses of approximately 100 volts amplitude are coupled to guide electrodes 121 and 122 of a "units" counting tube 123.

The "units" counting tube 123 is a cold cathode gas filled device which has an anode 124, ten cathodes 125–1 to 125–0, and the two guide electrodes 121 and 122. This tube 123 functions as a counting and display device. Current can only flow from one cathode 125 at a time to the anode 124. This causes a glow discharge at that cathode 125 which can be seen outside the tube 123. By applying a negative pulse to each of guide electrodes 121 and 122 in turn, the glow can be transferred to the adjacent cathode 125, The glow is visible through the top of the tube 123 so the counting action can be seen, read and followed on a calibrated template.

The phase relationship of the pulses fed to the guide electrodes 121 and 122 is most important. The glow actually transfers from one cathode, for instance cathode 125–4, to the first guide electrode 122, on to the second guide electrode 123, and then to the next cathode 125–5. By reversing the sequence the pulses are applied to the two electrodes 122 and 123, the glow will transfer back to the previous cathode 125–4. Thus, this tube 123 can be used as by-directional counter. In the present application, however, the tube 123 only counts in a forward direction. To reset the tube, the glow can be made to go to a particular cathode 125 by making it more negative than the others.

The anode 124 of the counting tube 123 is connected through a current limiting resistor 126 to a source of +400 volts. The cathode 125–1 is connected through a resistor 127–1 to chassis. The other nine cathodes 125–2 to 125–0 are connected through resistors 127–2 to 127–0 respectively, to a control lead 128. In addition, the cathodes 125–1 to 125–0 are connected to the respective positions of a ten position selector switch 129.

When the cathode 125–0 in the "units" counting tube 123 glows, the resultant current through the resistor 127–0 produces a positive-going voltage step which is applied to a pulse amplifier 130. Each positive input step produces at the output of the pulse amplifier 130 a negative pulse having an amplitude of approximately 100 volts. The output pulses are coupled through a coupling capacitor 131 to a phasing network comprising resistors 132, 133 and 134, and a capacitor 135. A diode 136 is placed in shunt with the phasing network to by-pass positive overshoot peaks to chassis through a series connected resistor 137 and the transistor 120. The squared negative pulses are coupled to control electrodes 138 and 139 of a "tens" counting tube 140.

The "tens" counting tube 140 is identical in operation to the "units" counting tube 123, and comprises an anode 141 which is coupled to a source of +400 volts through a current limiting resistor 142. The tube 140 also comprises ten cathodes 143–1 to 143–0. Connected between the cathode 143–0 and chassis is a resistor 144–0. Connected to the other nine cathodes 143–1 to 143–9 are resistors 144–1 to 144–9 respectively. The other ends of the resistors 144–1 to 144–9 are connected to the control lead 128. In addition, each of the cathodes 143–1 to 143–0 is connected to the respective terminals of a ten-position selector switch 145.

When a negative pulse is received over the control pair 101, it is coupled to a pulse amplifier 146 through a clipping network comprising a resistor 147 and a diode 148, which by-passes all the positive pulses of the incoming pulse train to ground. The output of the pulse amplifier 146 is connected to the transistor 120. The transistor 120 is biased in a forward conducting state in the absence of a negative input pulse thereto, thereby effectively connecting the lead 128 to chassis. A negative input pulse to the amplifier 146 produces a negative output pulse which turns off the transistor 120. Only the cathodes 125–1 and 143–0 are now returned to chassis, and the counting tubes 123 and 140 will therefore reset to the position 01.

Thus, whenever a positive pulse is received over the control pair of leads 101, a "one" is added to the total stored in the counting circuit 55 and is displayed on the counting tubes 123 and 140. The total stored in the counting circuit 55 is reset to 01 whenever a negative pulse is received on the control pair 101.

The wiper arms of the switches 129 and 145 are connected to the inputs of amplifiers 149 and 150 respectively. The outputs of the two amplifiers 149 and 150 are connected to an AND gate 151 which in turn is connected to the output connections 56. Whenever one of the cathodes 125 or 143 glows, a current flows through the attached cathode resistor 127 or 144 respectively. This in turn generates a positive voltage with respect to the chassis. When the settings of the seelctor switches 129 and 145 correspond with the numbers presented on the counting tubes 123 and 140, the voltages on the cathodes 125 and 143 will be coupled through the switches 129 and 145, and the amplifiers 149 and 150 respectively. This in turn actuates the AND gate 151 and connects a negative voltage to the control lead 56.

FIGURE 8 illustrates the search or preset control circuit 54. As hereinbefore explained, the control circuit 54 has two inputs; one from the detector 52 through the lead 53 and the other from the digital counter 55 through the lead 56.

The circuit 54 will first be described in the search position. Signals from the detector 52 are coupled through the lead 53, a series resistor 200 and a switch 201A connected in the search position, to the base of a NPN transistor 203. Whenever a 20 kilocycle per second signal is coupled to either of the leads 43T or 43R from one of the leads in the cable 22, as shown in FIGURE 1, the output from the detector 52 is approximately zero volts. Under these conditions, the transistor 203 is maintained in a saturated state by biasing resistors 204 and 205. The collector 206 of the transistor 203 therefore drops to approximately chassis potential. The voltage on the collector 206 is coupled through a resistor 207 to the base 208 of a PNP transistor 209. The emitter 210 of the transistor 209 is connected directly to a +6 volt source of voltage while the collector 211 is connected through a resistor 212 to a −12 volt source of voltage. During the presence of the input signal, the transistor 203 is in saturation and the base 208 of the transistor 209 is therefore held negative with respect to the emitter 210. The transistor 209 is therefore driven into saturation and the collector 211 rises to approximately +6 volts. This positive voltage is coupled through a resistor 213 to the output lead 57.

With no 20K c./s. signal coupled to either of the leads 43T or 43R, the detector 52 develops an output signal of approximately −12 volts which is coupled to the base 202. This negative voltage cuts-off the transistor 203 and the collector 206 rises to the supply potential. With no voltage differential between the base 208 and the emitter 210, the transistor 209 is cut-off, and its collector 211 decreases to approximately the supply potential of −12 volts. This negative voltage is coupled through the resistor 213 to the output lead 57.

When the switch 201 is in the preset position, signals from the counter 55 are coupled through the lead 56, a resistor 214 and the switch 201A to the base 202. Whenever the count on the counting tubes 123 and 140 shown in FIGURE 7, does not equal the preset position on the switches 129 and 145 respectively, the AND gate 151 is closed, resulting in −12 volts being applied to the lead 56. This negative voltage cuts-off the transistor 203 which in turn shuts-off the transistor 209. The collector 211 decreases to approximately the supply potential of −12 volts and this voltage is coupled through the resistor 211 to the output lead 57.

However, when the count on the counting tubes 123 and 140 equals the preset position on the switches 129 and 145, the AND gate 151 is opened and the lead 56 is effectively connected to chassis. As a result, both the transistors 203 and 209 are driven into saturation and the collector 211 rises to approximately +6 volts. This forward biases a diode 213 which is now connected in shunt with the output lead 57 through the switch 201B. Since the voltage on lead 57 is restricted from going positive by the forward biased diode 215, the output voltage under these conditions is approximately zero volts. The diode 215 does not affect the negative output voltage since it is reversed bias and therefore presents a high impedance to the output lead 57.

In the search position, whenever the clip leads 43T and 43R are connected to a pair of wires in the cable 22 on which a 20K c./s. signal is being received, a +6 volt signal is coupled from the output lead 57, through the simplex circuit comprising the control leads 102 and the transformers 35 and 58, and the lead 36 to the control logic circuit 29. However, when no 20K c./s. signal is received, a −12 volt signal is sent to the control logic circuit 29.

In the preset position, when the numbers displayed on the counting tubes 123 and 140 are the same as the settings on the preset switches 129 and 145, a signal of zero volts is sent to the control logic circuit 29. Conversely, when the counting tubes 123 and 140 and the preset switches 129 and 145 display different numbers, a −12 volt signal is coupled to the control logic circuit 29.

A manual reset which overrides all other signals generated by the control circuit 54, is included and is operated by closing a switch 216 which places the source of −12 volts across the output connections 57 through a resistor 217.

FIGURE 9 illustrates the 50-cycle digital phase comparator and indicator 45 which comprises input connections from the clip leads 43, input connection 59 from the transformer 58, and input connection 57 from the control circuit 54. An incoming 50-cycle per second reference signal is coupled from the transformer 58 to the input connection 59. The signal is coupled through a square-wave converter 250, the output of which is inverted and is coupled to an input of an AND gate 251 and also through an 180° phase inverter 252 to an input of a second AND gate 253.

A 50-cycle signal coupled from a pair of wires under test is coupled to the balanced clip leads 43. The signal first passes through a phase-shift network 254 and thence through a square-wave converter 255. The output of the square-wave converter 255 is passed through a pulse shaper 256. The pulse shaper 256 produces only one negative going pulse per cycle of the 50-cycle input signal. Due to the phase-shift network 254, this negative pulse falls approximately in the middle of the negative excursion of the square-wave pulse produced by phase inverter 252, if the clips leads 43 are correctly phase connected to the pair of wires under test. The pulses from the pulse shaper 256 are applied simultaneously to the AND gates 251 and 253.

As herebefore explained, the control circuit 54 produces a signal of either −12 volts, +6 volts or zero volts. These signals are coupled from the control circuit 54 through the lead 57 to an inhibiter circuit 257. Whenever the input signal on the lead 57 is +6 volts, a negative output signal from the inhibiter circuit 257 is simultaneously applied to the AND gates 251 and 253. However, whenever the input signal on the lead 57 is zero or −12 volts, a positive signal is applied from the inhibiter circuit 257 to the AND gates 251 and 253. Both the AND gates 251 and 253 produce an output signal only when all three input signals thereto are negative.

If the clip leads 43 are properly phase connected to the pair of wires under test, all three signals to the AND gate 253 will be negative once during each cycle of the 50-cycle signal, thereby opening the AND gate which in turn actuates a lamp control circuit 258 and thereby illuminates a lamp 259. This indicates that the clip leads 43 are correctly polarized. If the clip leads 43 are reversed, the signals applied to the AND gate 251 will be in phase once during each cycle of the 50-cycle signal which opens the AND gate 253 and through a control circuit 260 lights a second lamp 261 thereby indicating incorrect connection of the leads 43. Both the lamp control circuits 258 and 260 contain an integration network which prevents operation of the lamps 259 and 261 by noise pulses, and conversely prevents either of the lamps 259 or 261 from extinguishing during the portions of the cycle which the respective AND gates 251 or 253 are not open.

The operation of the central office unit 20 will now be described in the following four distinct modes of operation:

(1) Idle condition—control pairs 101 and 102 disconnected from the cable 22;
(2) A negative voltage applied to the simplex circuit;
(3) Zero volts applied to the simplex circuit;
(4) A positive voltage applied to the simplex circuit.

The above mentioned voltages are generated by the search or preset control circuit 54 and are connected by the lead 57 and the simplex circuit, comprising a cable pair 102 and the transformers 35 and 58, to the lead 36. All voltages are with respect to the chassis of the field unit 21 which as heretofore explained is maintained at −24 volts with respect to the ground in the central office unit 20.

*Idle condition—control pairs 101 and 102 disconnected*

Referring to FIGURES 2A, 2B, 3A and 3B, the start relay S1 operates through the series connected break contacts U1–10 to U8–10 which completes a path to ground from the −48 volt source. This in turn operates the start relay S2 through the make contacts S1–12; and also the start relay S3 through the make contacts S1–10.

The steering units relay SU operates through the break contacts U1–6, U3–6, U5–6 and U7–6 which are connected to ground through the break contacts RST–11 of the reset relay RST. To prevent transients from opening the relay SU when the relay S2 is operated, a locking path, consisting of make contacts SU–7 and S2–4, is connected in shunt with the break contacts U1–6, U3–6, U5–6 and U7–6.

The steering eights relay SE operates through the break contacts R1–12, R3–12, R5–12, R7–12, R9–12, R11–12, the break contacts of the transfer contact CA–9 and through the break contacts RST–11 to ground.

Operation of the start relays S1 and S2 completes the path through the make contacts S1–8 and S2–5 to operate the units relay U1. In addition, operation of the start relay S2 connects a source of −48 volts through the make contacts of the transfer contacts S2–2 and the resistor 65 to the control lead 101T (FIGURE 4).

Operation of the start relay S3 causes the transfer of contacts S3–5 thereby opening one of the operate paths of the reset relay RST, and partially completing a locking path to ground for the relay S3.

Operation of the units relay U1 releases the start relay S1 through actuation of the break contacts U1–10. In addition, the steering units relay SU releases through the actuation of the break contacts U1–6. The units relay U1 is also locked up through its own make contacts U1–4 and the break contacts U2–2 to ground through the break contacts RST–11.

Release of the start relay S1 releases the start relay S2 which removes the −48 volts from the control lead 101T. This marks the end of the reset pulse which if the control pairs 101 and 102 were connected would be coupled to the field unit 21. The central office unit 20 remains idle until the control leads 101 and 102 are connected to the field unit 21. The polarity of the voltage connected from the simplex circuit to lead 36 with respect to the reference lead 101R will then determine the operation of the central office unit 20.

*Negative voltage applied to simplex circuit*

As in the idle condition, the start relay S1, the steering units relay SU and steering eights relay SE operate. Again, operation of the start relay S1 operates the start relays S2 and S3; while operation of start relays S1 and S2 operate the units relay U1. This releases the start relay S1, which in turn releases the start relay S2.

Referring to FIGURE 5, a negative voltage coupled from the simplex circuit to the lead 36 is coupled to the transistor 67 thus turning the latter on. This actuates the scanning control relay SC which remains actuated as long as the negative voltage is present on the lead 36. Therefore, when the start relay S1 releases, the start relay S3 remains operated over the make contacts of transfer contacts S3–5 which goes to ground through the make contacts SC–3.

The units relay U1 is now locked through its own make contacts U1–4 in series with the break contacts U2–2 and RST–11 to ground. Operation of the units relay U1 completes the path for the output signal of the 20 kilocycle oscillator 23 which is coupled through the filter 24 to the lead 25R (FIGURE 1). As shown in FIGURE 3, the 20 kilocycle signal is coupled from the lead 25R through the break contacts of the transfer contacts CA–1, the break contacts of transfer contacts U2–1 to U8–1, the make contacts U1–1 and the break contacts of the transfer contacts R1–1 to R12–1, to the lead 01R. Operation of the units relay U1 also releases the start relay S1 which in turn releases the start relay S2 and the steering units relay SU through the break contacts U1–6. In addition, operation of the relay U1 operates the units relay U2 through the make contacts U1–3, the break contacts SU–1 and the make contacts SC–1 to ground through the break contacts RST–11.

Operation of the units relay U2 releases the relay U1 through the break contacts U2–2. Release of the relay U1 reoperates the relay SU by closing the break contacts U1–6. This in turn operates the relay U3 through the make contacts U2–3, SU–1, SC–1 to ground through the break contacts RST–11. It also completes the path for the 20 kilocycle per second signal which is coupled to the lead 25R, through the break contacts CA–1, U3–1 to U8–1; the make contacts U2–1 and the break contacts R1–2 to R12–2, to the lead 02R.

Operation of the units relay U3 releases the relay U2 through the break contacts U3–2; and also releases the relay SU through the break contacts U3–6. This allows the units relay U4 to operate through the make contacts U3–3, the break contacts of the transfer contacts SU–1, the make contacts SC–1 to ground through the break contacts RST–11. It also completes the path for the 20 kilocycle per second signal which is coupled to the lead 25R through the break contacts CA–1, U4–1 to U8–1; the make contacts U3–1 and the break contacts R1–3 to R12–3, to the lead 03R.

Operation of the units relay U4 releases the relay U3 through the break contacts U4–2. Release of the relay U3 reoperates the relay SU by closing the break contacts U3–6. Operation of the relay U4 operates the relay U5 through the make contacts U4–3, SU–1, SC–1 to ground through the break contacts RST–11. It also completes the path for the 20 kilocycle per second signal which is coupled to the lead 25R through the break contacts CA–1, U5–1 to U8–1; the make contacts U4–1 and the break contacts R1–4 to R12–4 to the lead 04R.

Operation of the units relay U5 releases the relay U4 through the break contacts U5–2; and also releases the relay SU by opening the break contacts U5–6. This in turn operates the relay U6 through the make contacts U5–3, the break contacts of the transfer contacts SU–1, the make contacts SC–1 to ground through the break contacts RST–11. It also completes the path for the 20 kilocycle per second signal which is coupled to the lead 25R through the break contacts CA–1, U6–1 to U8–1; the make contacts U5–1 and the break contacts R1–5 to R12–5 to the lead 05R.

Operation of the units relay U6 releases the relay U5 through the break contacts U6–2. Release of the relay U5 reoperates the relay SU by closing the break contacts U5–6. This in turn operates the relay U7 through the make contacts U6–3, SC–1 to ground through the break contacts RST–11. It also completes the path for the 20 kilocycle per second signal which is coupled to the lead 25R through the break contacts CA–1, U7–1 and U8–1; the make contacts U6–1 and the break contacts R1–6 to R12–6, to the lead 06R.

Operation of the units relay U7 releases the relay U6 through the break contacts U7–2; and also releases the relay SU by opening the break contacts U7–6. This in turn operates the relay U8 through the make contacts U7–3, the break contacts of the transfer contacts SU–1, the make contacts SC–1 to ground through the break contacts RST–11. It also completes the path for a 20 kilocycle per second signal which is coupled to the lead 25R through the break contacts CA–1 and U8–1; the make contacts U7–1 and the break contacts R1–7 to R12–7 to the lead 07R.

Operation of the units relay U8 releases the relay U7 through the break contacts U8–2. Release of the relay U7 reoperates the relay SU by closing the break contacts U7–6. This in turn operates the carry relay CA through the make contacts U8–3, SU–1, SC–1 to ground through the break contacts RST–11. It also completes the path for the 20 kilocycle per second signal which is coupled to the lead 25R through the break contacts CA–1, the make contacts U8–1 and the break contacts R1–8 to R12–8 to the lead 08R.

Operation of the carry relay CA holds the steering eights relay SE operated over its own lock path consisting of make contacts SE–7, CA–9 to ground through the break contacts RST–11. As hereinbefore explained, the relay SE is made slow to release by the diodes connected in shunt therewith. This gives sufficient time for the transfer of ground through the make and break contacts of the transfer contacts CA-9. The tip and ring relays T1 and R1 also operate through the make contacts CA-7, the series connected break contacts R2-10 to R12-10, to ground through the break contacts RST-11. Operation of the relays R1 and T1 transfers the contacts R1-1 to R8-1 and T1-5 to T1-12 thereby partially completing the circuit to the tips and rings of the cable pairs 09 to 16. In addition, operation of the relay R1 reoperates the relay U1 through the make contacts R1-11, make contacts of transfer contacts SE-2, make contacts of transfer contacts SU-1, make contacts SC-1 to ground through the break contacts RST-11. The circuit is now conditioned for scanning the next eight cable pairs 09 to 016.

Reoperation of the relay U1 releases the relay U8 through the break contacts U1-2. Release of the relay U8 also causes the relay CA to drop out by opening the make contacts U8-6. Release of the carry relay CA opens the make contacts CA-9 and with the break contacts R1-12 open the steering eights relay SE releases. In addition, release of the carrier relay CA opens the contacts CA-8 and with the break contacts U1-6 open, the steering units relay SU releases. This in turn operates the relay U2 through the make contacts U1-3, the break contacts SU-1, the make contacts SC-1 to ground through the break contacts RST-11.

Operation of the relay U1 completes the path for the 20 kilocycle per second signal which is coupled to the lead 25R through the make contacts CA-1, U1-1; the break contacts R2-1 to R12-1, and the make contacts R1-1, to the lead 09R.

The make contacts CA-10 and the transfer contacts SE-1 (FIGURE 2C) perform their functions later, in a similar manner to that of the make contacts SC-1 and the transfer contacts SU-1, as the scanning sequence progresses through the eights relays T2 to T12 and R2 to R12 for scanning the remainder of the cable pairs 17 to 100.

Reoperation of the relay U2 releases the relay U1 through the break contacts U2-2 as hereinbefore explained. It has also completed the path for the 20 kilocycle per second signal which is coupled to the lead 25R through the break contacts CA-1, U3-1 to U8-1; the make contacts U2-1, the break contacts R2-2 to R12-2, and the make contacts R1-2 to the lead 10R. The scanning sequence has been described as far as the tenth cable pair. The sequence will continue until the tone is placed on cable pair 16 by actuation of the relay U8 which in turn will actuate the carry relay CA as hereinbefore described.

Referring to FIGURES 2A, 2B, 2C, 3A and 3B, reoperation of the carry relay CA operates the eights relays T2 and R2 through the make contacts T1-3, the break contacts of the transfer contacts SE-1, the make contacts CA-10 to ground through the break contacts RST-11. Operation of the relay R2 opens the break contacts R2-10 thereby releasing the eights relay T1 and R1. In addition, the relay U1 is operated through the make contacts R2-11, the break contacts of transfer contacts SE-2, the make contacts of transfer contacts SU-1, the make contacts SC-1 to ground through the break contacts RST-11. The scanning sequence thus continues with the 20 kilocycle per second signal being sequentially applied to the leads 17 to 25.

Previous operation of the relay U1 released the relay CA which in turn released the relay SE. However, due to the operation of the relay R2, the relay SE now remains operated through its locking contacts SE-7, and the make contacts R2-12 to ground through the break contacts RST-11. Thus, when the relay CA is again operated as hereinbefore described, the eights relays R3 and T3 are operated through the make contacts T2-3, SE-1 and CA-10 to ground through the break contacts RST-11.

Operation of the relay T3 releases the relays T2 and R2 by opening the break contacts T3-2.

The circuit continues to scan in a like manner using the eights relays T4 to T12 and R4 to R12, along with the unit relays U1 to U8 and the carry relays CA until the one hundred and fourth position has been reached; the last four positions not being connected to any of the pairs of wires in the cable 22.

At this point, the units relay U8 and the eight relay T12 are operated thereby operating the reset relay RST through the make contacts U8-7 and T12-3 to ground. Operation of the relay RST removes the common ground by opening break contacts RST-11 thereby releasing all the relays. If the negative voltage is still applied to the lead 36, the scanning cycle will continue to repeat itself.

*Zero volts applied to the simplex circuit*

It is assumed that the central office unit 20 has scanned to the cable pair 04 when the negative voltage on the simplex circuit changes to zero volts. This voltage which is coupled to the lead 36 shuts off the transistor 67 thereby releasing the scanning control relay SC. The contacts SC-3 reopen thereby releasing the relay S3, the relay U4 is held operated over the make contacts U4-4, the break contacts U5-2 to ground through the break contacts RST-11. However, the relay U3 releases by opening the break contacts U4-2 which in turn operates the relay SU by closing the break contacts U3-6. The relay U4 being operated, holds the 20 kilocycle per second signal on the lead 04R.

Because the scanning cycle can be stopped at any one of a hundred positions, the steering units relay SU remains locked up whenever one of the even units relay U2, U4, U6 or U8 is operated; and the steering eight relay SE remains locked up whenever one of the even eights relays R2, R4, R6, R8, R10 or R12 is operated.

*Positive voltage applied to the simplex circuit*

It is assumed that at the beginning that the central office unit 20 is scanning freely until the units relay U5 is operated thereby applying the 20 kilocycle per second signal to the cable pair 05. At this point, a positive voltage is fed to the simplex circuit and is coupled to the lead 36. A positive voltage turns off the transistor 67 thereby releasing the scanning control relay SC; and turns on the transistor 71 thereby operating the oscillator control relay OC.

Release of the scanning control relay SC releases the start relay S3 by opening the make contacts SC-3. The units relay U4 releases through the break contacts U5-2 and the units relay U5 locks to ground through the make contacts U5-4 and the break contacts U6-2 and RST-11, thereby holding the 20 kilocycle per second signal on the lead 05R.

Referring to FIGURE 6, operation of the oscillator control relay OC connects one side of the output of the 50 cycle per second filter 33 through the make contacts OC-1, the resistor 85 to the lead 25T. In addition, a source of —48 volts is connected through the make contacts OC-3, the resistor 83 and the thermistor 84 to ground across the control relay C, which operates after a delay due to the thermistor 84. Operation of the control relay C couples the supply voltage of —48 volts to the 50 cycle per second oscillator 31 through the make contacts OC-3, C-12 and the lead 32. In addition, the —48 volt source is decoupled from the scanning control relay SC by the opening of the break contacts C-11.

A short circuit is placed across the thermistor 84 by the closing of make contacts C-9 thereby allowing the thermistor 84 to cool and hence ready it for the next time the relay OC operates. Operation of the relay C closes the make contacts C-10 which applies the output from the 50 cycle per second filter directly to the input to the scanning matrix 26 through the leads 25. The 50 cycle per second signal remains connected across the tip and ring of the cable pairs 05 as long as the positive signal is coupled to lead 36 from the simplex circuit. At the same time, the 50 cycle per second signal is coupled to the reference pair of leads 102 (FIGURE 1) in order to establish tip and ring identification of the cable pair 15 in the field unit 21.

*Overall operation of the cable pair identifier*

The overall operation of the central office unit 20 and the field unit 21 will now be described in the following two distinct modes of operation:
(1) Automatic search position.
(2) Preset control position.

*Automatic search position*

Let us assume at the beginning that the control pairs 101 and 102 are connected but the clip leads 43 are disconnected. When the switch 201 is set in the search position, a negative voltage will be coupled from the search or preset control circuit 54 on the lead 57 through the simplex circuit to the lead 36 which through the control logic circuit 29 sets the scanning control circuit 27 into operation. As hereinbefore described, a negative reset pulse will be generated by the count and reset pulse generator 28 and coupled through the control pair 101 to the digital counter and preset switch 55. Thereafter, the 20 kilocycle per second signal will be sequentially applied to the pairs 01 to 100 of the cable 22. As the 20 kilocycle per second signal is coupled to each pair, a positive counting pulse will be generated on the control lead 101T with respect to the lead 101R by the generator 28. At the end of the complete scanning sequence, a negative reset pulse will be generated by the count and reset pulse generator 28 and the sequence will repeat itself.

Let us assume that through a random choice, the clip leads 43T and 43R are connected to the cable pair 37. When the 20 kilocycle per second signal is applied to the lead 37R, the signal is coupled through either the capacitor 46 or 47, and the resistor 48 to the lead 49, and thence through the filter 50, the amplifier 51 and detector 52. The resulting signal output from the amplifier 51 cuts off the negative voltage from the output of the detector 52. The detector output signal is coupled through the lead 53 to the search or preset control circuit 54 which in response to zero voltage at its input produces a positive output voltage on the lead 57. This positive voltage is conveyed through the simplex circuit to the lead 36 thereby stopping the scanning sequence and applying the 50 cycle per second signal through the scanning matrix 26 to the leads 37. The 50 cycle per second signal is coupled through the clip leads 43 to one input of the digital phase comparator and indicator 45. Concurrently, the 50 cycle per second reference signal is coupled through the capacitor 34, the transformers 35, the control pair 102, the transformer 58 and the lead 59 to a second input to the 50 cycle per second digital phase comparator and indicator 45. Since the voltage on the control lead 57 is positive, either the lamp 259 or the lamp 261 will light depending upon whether or not the clip leads 43 are correctly or incorrectly polarized, thus indicating the tip and ring of the leads 37.

Since positive counting pulses have been simultaneously applied to the control pair 101 concurrently with the application of the 20 kilocycle per second signal to the leads R of the cable 22, the digital counter 55 will automatically register the cable pair number 37. Hence, full identification of the cable pair 37 has been established.

*Preset control position*

Let us assume that the lineman wishes to establish the identification of a particular pair of wires, for instance cable pair 56. The preset switches 129 and 145 are turned to position 56 and the switch 201 is set to the preset position. With a negative voltage on the control lead 57, which is coupled to the lead 36, the central office unit 20 will commence to scan in the normal manner. When 56 counting pulses have been received by the digital counter and preset switch circuit 55, the AND gate 151 will open and the negative voltage on the output lead 56 will be cut-off. This signal will be coupled to the search or preset control circuit 54 thereby resulting in zero signal being connected to the control lead 57, the zero signal is coupled to the control logic circuit 29 thereby stopping the scanning sequence and applying the 20 kilocycle per second signal to cable pair 56. The digital counter 55 will indicate that the signal is now coupled to the proper pair of wires. The lineman can then search with the probe 41. When the probe 41 is coupled to the leads 56, the heterodyne receiver 40 generates a 1,000 cycle per second signal which is coupled to the headset 42.

The present embodiment is designed to operate up to a distance of 20,000 feet between the central office unit 20 and the field unit 21 with a scannning time of approximately three seconds. The 20 kilocycle per second signal level which is applied to the lead 25R is 300 millivolts. The use of such a signal prevents interference with the service of the cable pair being identified or other pairs in the cable.

We claim:
1. In a cable pair identifier comprising:
   (a) transmitter means for connecting a source of signal voltage to a preselected pair of numbered wires and to a reference pair of wires in a multipair cable; and
   (b) receiver means for detecting the presence of said signal voltage on said preselected pair of wires in the multipair cable;
   (c) the improvement comprising: the receiver means additionally comprising means for comparing the phase of the signal from the source of signal voltage connected to said preselected pair of wires against the phase of the signal from the source connected to said reference pair of wires, thereby identifying the polarity of said preselected pair of wires.
2. In a cable pair identifier comprising:
   (a) a scanning unit having scanning means for sequentially connecting in numerical order a first source of signal voltage to each pair of wires in a multipair cable, and also having a pulse generator for producing either a counting pulse of one polarity concurrently with the connection of said source of signal voltage to each of the pairs of wires, or a reset pulse of the other polarity;
   (b) and a receiving unit having detector means for detecting said signal voltage when said receiving unit is connected to one of the pairs of wires in said multipair cable; said receiving unit also having a digital counter responsive to the output from the pulse generator for registering the number of counting pulses received between each reset pulse; said scanning unit also having a control logic unit responsive to the output from the detector means for automatically stopping the scanning means when the source of signal voltage is connected to said one pair of wires in said cable;
   (c) the improvement comprising: the scanning unit additionally having a second source of signal voltage, and a control means, responsive to the control logic unit, for connecting said second source of voltage to said one pair of wires when the scanning means has stopped;
   (d) and the receiving unit additionally having a phase comparator for comparing the phase of the signal from the second source of voltage connected to said one pair of wires to the phase of the signal from said second source connected to a reference pair of wires, thereby identifying the polarity of said one pair of wires.
3. A cable pair identifier as defined in claim 2 in which the signal from the first source of signal voltage is vir- tually ultrasonic and the signal from the second source of signal voltage is virtually infrasonic.

4. A cable pair identifier as defined in claim 3 in which the receiving unit additionally has selector switches having a plurality of positions that correspond to the number of each pair of wires in said multipair cable, and means responsive to the coincidence of the same number on said selector switches and said digital counter for connecting a control signal to said control logic circuit to stop the scanning means, thereby connecting said source of signal voltage to a preselected pair of wires in the multipair cable.

References Cited

UNITED STATES PATENTS

| | | | |
|---|---|---|---|
| 2,869,077 | 1/1959 | Houk | 179—175.25 |
| 3,252,088 | 5/1966 | Palmer | 179—175.25 |
| 3,287,509 | 11/1966 | Bohnenblust | 179—175.3 |
| 3,288,943 | 11/1966 | Bohnenblust | 179—175.3 |
| 3,288,944 | 11/1966 | Fleming | 179—175.3 |
| 3,288,945 | 11/1966 | McNair | 179—175.3 |

KATHLEEN H. CLAFFY, *Primary Examiner.*

A. A. McGILL, *Assistant Examiner.*